United States Patent [19]

Hsu

[11] Patent Number: 5,498,211

[45] Date of Patent: Mar. 12, 1996

[54] BICYCLE SPEED CHANGE MECHANISMS

[76] Inventor: Yi-Hsung Hsu, No. 9, Lane 130, Sec. 1, Kuang Fu Rd., Sanchung Taipei Hsien, Taiwan

[21] Appl. No.: 350,091

[22] Filed: Nov. 29, 1994

[51] Int. Cl.[6] ................................................. F16H 59/04
[52] U.S. Cl. ................................................. 474/80; 74/475
[58] Field of Search .......................... 474/78–80; 74/475

[56] References Cited

U.S. PATENT DOCUMENTS

| | | | |
|---|---|---|---|
| 4,027,542 | 6/1977 | Nagano | 474/82 |
| 4,277,077 | 7/1981 | Ozaki | 474/80 X |
| 4,494,944 | 1/1985 | Coue | 474/82 |
| 4,601,682 | 7/1986 | Nagano | 474/80 |
| 4,690,663 | 9/1987 | Nagano | 474/80 |

*Primary Examiner*—Roger J. Schoeppel
*Attorney, Agent, or Firm*—Bacon & Thomas

[57] ABSTRACT

An improved form of bicycle speed change mechanism, characterized in that, a speed change support is installed to sustain and keep a bicycle chain at a fixed tension; a stop ring installed on the speed change support is bent to one side to form a positioning plate that is bent outwardly; a C-type snap ring is inserted in the gap of a support shaft; one end of the C-type snap ring extends outwardly to form a handle; one end of the handle forms a horizontal plate on which two guide holes are formed; two bolts are mounted in the guide holes; adjustment of the length of the two bolts extruding from the guide holes of the horizontal plate controls the angle of rotation of the stop ring wtih respect to the baffle angle of the bicycle frame, and consequently changes the force produced by the torsion spring which is dragged by the stop ring.

4 Claims, 3 Drawing Sheets

BICYCLE SPEED CHANGE MECHANISMS

BACKGROUND OF THE INVENTION

1. Field of the Invention

The present invention relates to an improved form of bicycle speed change mechanism for bicycles and particularly to a speed change device in which there is an adjusting mechanism provided.

2. Description of the Prior Art

A conventional speed change mechanism as shown in FIG. 1 is well known wherein a speed change mechanism 100 is mounted at the rear of a bicycle, a torsion spring being mounted in a speed change support 101 of the speed change mechanism 100 to press a flange thereof against a baffle angle of the bicycle frame. When the rider pulls all adjusting cable 102 to change the riding speed, a double connecting lever sliding mechanism, installed on the speed change mechanism 100, produces a parallel sliding action and moves a chain guider 103 connected to the other end of the double connecting lever horizontally. A bicycle chain 104 is then moved to the next rear transmission gear accordingly. During this procedure, as the radius of the rear transmission gear changes, the whole speed changer must move backwards to compensate the difference resulting from such change so as to keep the bicycle chain 104 at the same tension; the force necessary for maintaining the chain tension comes from the torsion spring which is installed in the speed change support 101.

FIG. 2 shows the structure of the common speed change mechanism, in which a support shaft 206 is installed in a support body 203 and then fixed in a tapped hole 200a on the bottom end of a bicycle frame 200. Also mounted on the support shaft 206 there are a cover 205, a spring 204, a sleeve tube 202 and a C-type snap ring 201, in which the outer rim of the cover 205 is fixed at the end of the support shaft 206, the step-type outer rim of the other side of the cover 205 presses the spring 204 into the support body 203 and onto the sleeve tube 202. The right hand end bent part of the spring 204 is fixed in a groove 203a of support body 203, the left hand end bent part of the spring 204 being fixed into a guide hole 202b formed on the left hand side stepped part of the sleeve tube 202. A threaded part 206b of the support shaft 206 extrudes from the sleeve tube 202, and a C-type snap ring 201 is put onto the gap 206a to prevent the sleeve tube 202 from dropping out of support body 203 and the thread 206b of the support shaft 206 is locked into the tapped hole 200a of the bicycle frame 200. However, to change the riding speed, a bicycle rider must pull the adjusting cable very often to move the chain guide horizontally so as to move the chain to the next rear transmission gear. After a long period of use, the elastic fatigue phenomenon will easily occur in the torsion spring 204. As it is impossible to adjust the spring coefficient or modify the spring's torsion force, the time necessary to change riding speed becomes longer and longer; furthermore, the tension force of the chain maintained by the chain guide becomes weaker. These are the common defects which occur in usual bicycle speed change mechanisms.

SUMMARY OF THE INVENTION

According to the present invention, an improved form of bicycle speed change mechanism is characterized in that a stop ring mounted at the front end of a support body is adapted to bend outwardly on one side to form a positioning plate and a C-type snap ring inserted in the gap of a support shaft, one end of the C-type snap ring extends outwardly to form a handle, one side of the handle forming a horizontal plate on which two guide holes are formed, adjustment of the length of the two bolts extruding from the guide holes of the angle plate controls the angle of rotation of the stop ring with respect to the baffle angle of the bicycle frame so as to keep the tension of bicycle chain fixed. Consequently, the bicycle chain will not drop out of the transmission gear. This is one of the objects of the present invention.

According to the present invention, the improved speed change mechanisms can shorten the time necessary to change the gear so that a bicycle rider will feel more comfortable at high speed. This is another object of the present invention.

A more complete understanding of these and other features and advantages of the present invention will become apparent from a careful consideration of the following detailed description of certain embodiments illustrated in the following drawings.

DESCRIPTION OF THE PREFERRED ENBODIMENTS

Figure 1:
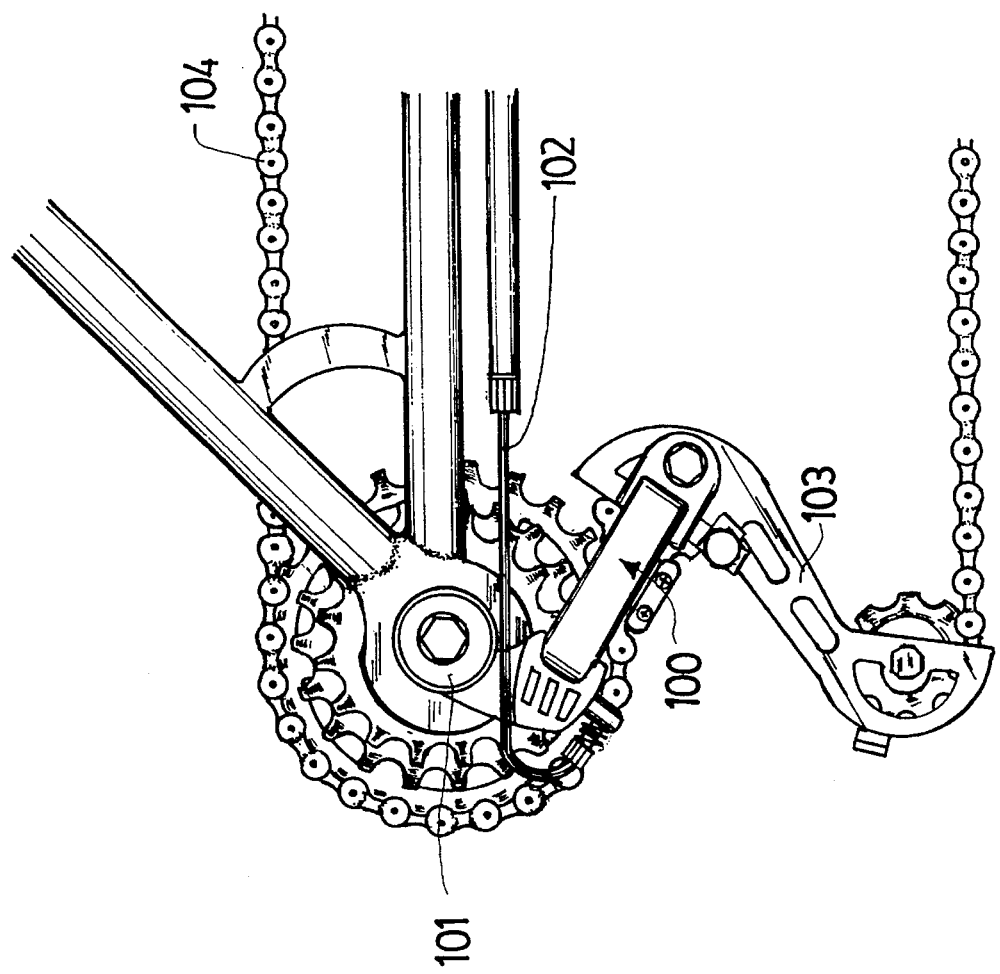
FIG. 1 is a diagramatic view showing a prior art bicycle speed change mechanism.
Figure 2:
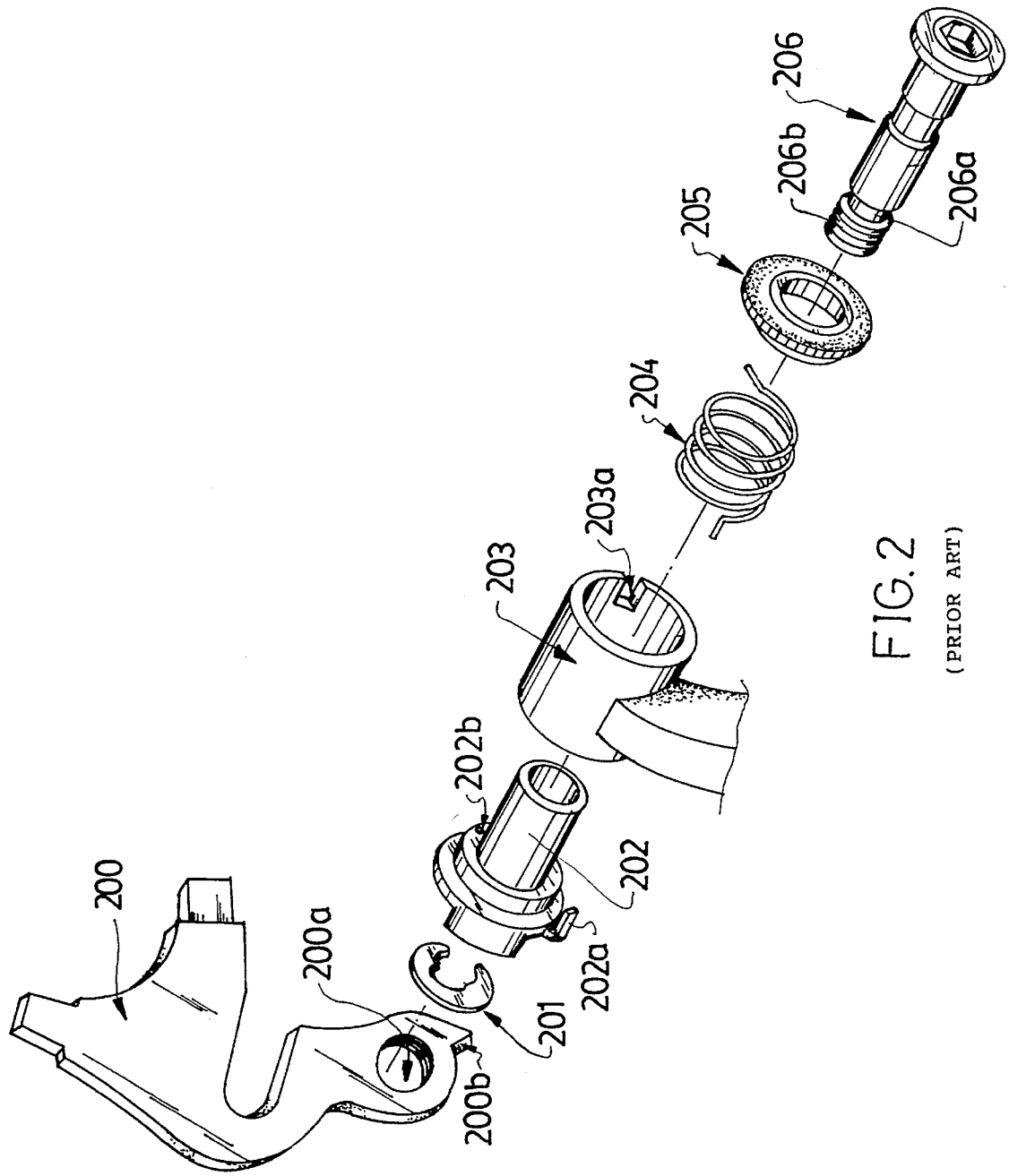
FIG. 2 is an exploded perspective view showing components of the common bicycle speed change mechanism of FIG. 1, which has been described above, too.

FIGS. 1 and 2 show an example of a conventional bicycle speed change mechanism, which has been described above, we don't repeat hereon.

Figures 3, 4:
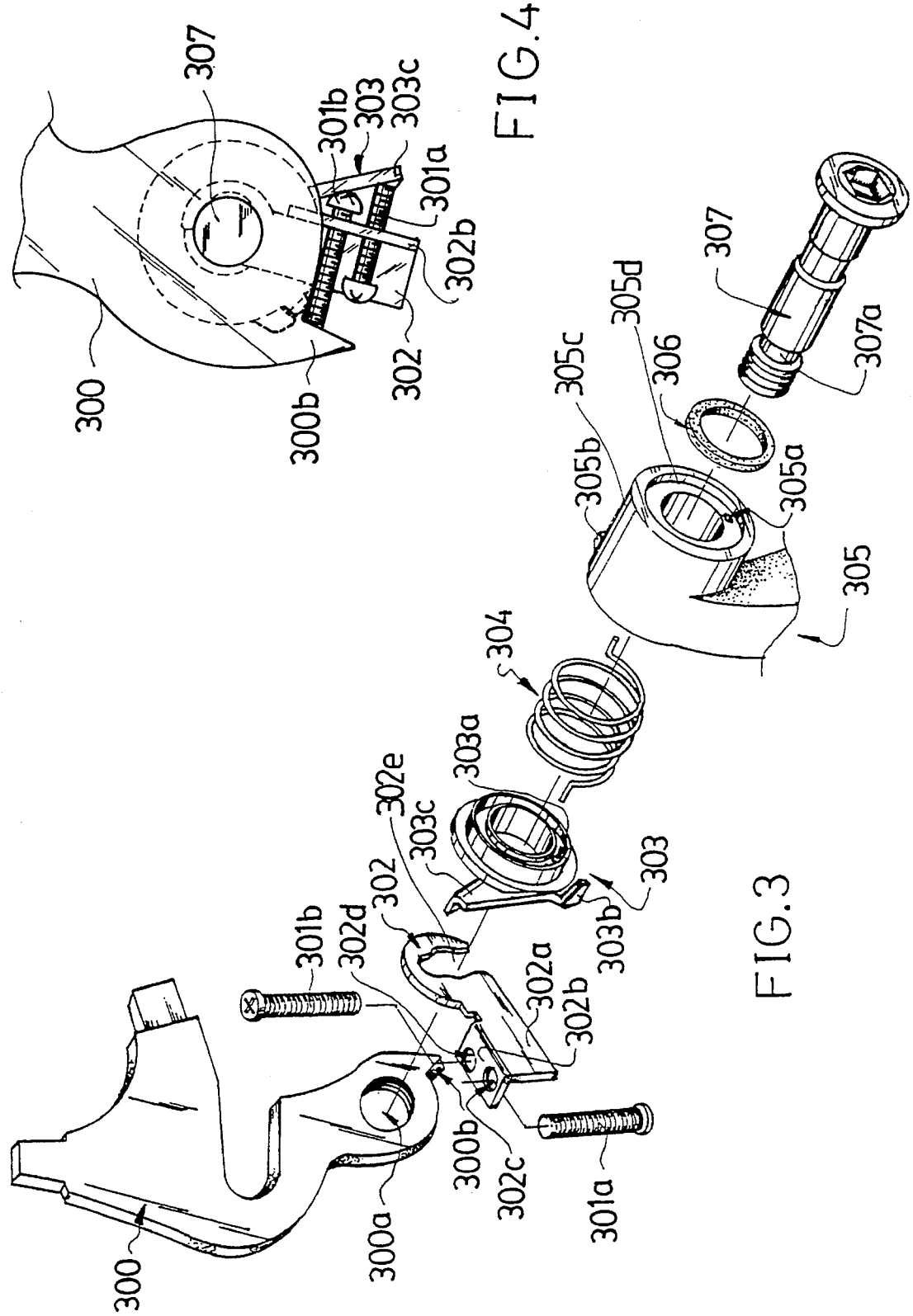
FIG. 3 is an exploded perspective view showing the components of the present invention.
FIG. 4 is a side view of the speed change mechanism of the present invention.

Referring to FIG. 3, there is shown the component parts of the present invention. An O-type ring 305d is mounted inside a hollow tube 305c installed on the upper end of a support body 305. A guide hole 305a is formed on the rim of the 0-type ring. A threaded part of a support shaft 307 is locked into a tapped hole 300a located at the bottom end of a bicycle frame 300. The support shaft 307 is mounted and fixed inside the hollow tube 305c of the support body 305 in which a washer 306 and a torsion spring 304 are inserted. The two ends of the torsion spring 304 are bent in the axial direction of the support body 305, the right hand end of the torsion spring being inserted into a guide hole 305a formed on the step-type outer rim of the support body 305, while the other end of the torsion spring is inserted into a guide hole 303a formed on the inner rim of a stop ring 303. The stop ring 303 is adapted to adhere to the outer end of the support body 305 to retain the spring 304 therein. The threaded part of the support shaft 307 passes through the support body 305 and through the stop ring 303. A C-type snap ring 302 is then put over a gap 307a of the support shaft 307 to prevent the stop ring 303 and the torsion spring 304 from leaving the support body 305. The outer rim of the stop ring 303 is bent outwardly to form a flange 303b. The flange 303b is arrested by a stop member 305b of the support body 305. This makes the stop ring 303 stop at a fixed point when it rotates as the result of the force from the torsion spring 304. Moreover, a positioning plate 303c is provided on the upper end of the flange 303b of the stop ring 303. One end of a hollow portion 302e of the C-type snap ring 302 extends outwardly to form a handle 302a. One side of the handle 302a is bent to form a horizontal plate 302b. Two tapped holes 302c and 302d are formed on the horizontal plate 302b. Two bolts 301a and 301b are, oppositely and separately, screwed into the two tapped holes; in the meantime, the end of the bolt 301b is pushed against a baffle angle 300b of the bicycle frame 300 while that of the other bolt 301a is pushed against the positioning plate 303c on the stop ring. Consequently, the positioning plate 303c of the stop ring, the horizontal plate 302b of the C-type snap ring, and the baffle angle 300b of the bicycle frame 300 are kept at a fixed distance. So, by adjusting the length of bolts 301a and 301b that extrude out of the tapped holes 302c and 302d of the horizontal plate 302b, the torsion spring 304, dragged by the stop ring 303, can be moved to compensate the spring force and to clear the phenomenon of elastic fatigue occurring in the torsion spring 304 after a long period of use.

Referring to FIG. 4, it can be seen that on the horizontal plate 302b of the C-type snap ring 302 which is mounted in the bicycle frame 300, the two bolts 301a and 301b are mounted in opposing directions. The bolt 301a passes through the lower part of the horizontal plate 302b and reaches the positioning plate 303c of the stop ring 303, while the bolt 301b passes through the upper part of the horizontal plate 302b and reaches the baffle angle 300b of bicycle frame 300. Thus, by adjusting the length of the bolts 301a and 301b extruding through the horizontal plate 302b of the C-type snap ring, the distance between the positioning plate 303c of the stop ring 303 and the baffle angle 300b of bicycle frame 300 can be controlled to adjust the spring force produced by the torsion spring 304 which is dragged by the stop ring 303. Meanwhile, by adjusting the two bolts 301a and 301b on the horizontal plate 302b, a bigger range of adjustment of the torsion spring 304 dragged by stop ring 303 can be achieved to move the stop ring 303 to drag the torsion spring 304 to compensate the spring force and thereby keep the spring tension at a fixed value so as to clear the phenomenon of elastic fatigue occurring in the torsion spring 304 after a long period of use.

Although the present invention has been described with a certain degree of particularity, the present disclosure has been made by way of example and changes in details of structure may be made without departing from the spirit thereof.

I claim:

1. A speed change mechanism for a bicycle having a bicycle frame with a tapped hole and a flange adjacent to said tapped hole, comprising: a support body having a hollow tube portion inside of the hollow tube portion being mounted an O-type ring, having a rim in which is formed a first guide hole, a chain guider being fixed to a side of the support body; a stop ring positioned on an end of the hollow tube portion of the support body, a second guide hole formed on a first side of the stop ring, and a V-shaped positioning plate connected on a second side; a torsion spring mounted inside the hollow tube portion of the support body, a first end of the torsion spring being inserted into the first guide hole formed on the O-type ring, and a second end of the torsion spring being inserted in the second guide hole formed on the stop ring; a C-type snap ring having an outwardly extending portion to form a handle, on which a plate is formed, the plate having two tapped holes engaged by two bolts, one bolt bearing against the flange and the other bolt bearing against the plate of the outwardly extending portion; and a support shaft having a threaded part extending through the hollow tube portion of the support body, the torsion spring, the stop ring, and the hollow portion of the C-type snap ring, and engaging the tapped hole located on the bicycle frame.

2. The bicycle speed change mechanism as claimed in claims 1, wherein said support shaft has a recessed gap in which the C-type snap ring is fixed.

3. The bicycle speed change mechanism as claimed in claim 1, further comprising a stop member formed on a surface of the hollow tube portion of the support body, and a flange formed on an outer rim of the stop ring located so as to contact the stop member and limit relative movement between the support body and the stop ring.

4. The bicycle speed change mechanism as claimed in claim 1, further comprising a washer mounted on the support shaft.

* * * * *